This application is a continuation of application Serial No. 266,910 filed March 21, 1963 entitled "Shaving Head for Use in a Dry Shaving Apparatus," now abandoned. This invention relates to a shaving head for use in a dry shaving apparatus, the skin-engaging shear plate of which is provided with slot-shaped apertures having locally varying depths of penetration for the skin where the shear plate is contacted by the upper contacting surface of a movable cutting member.

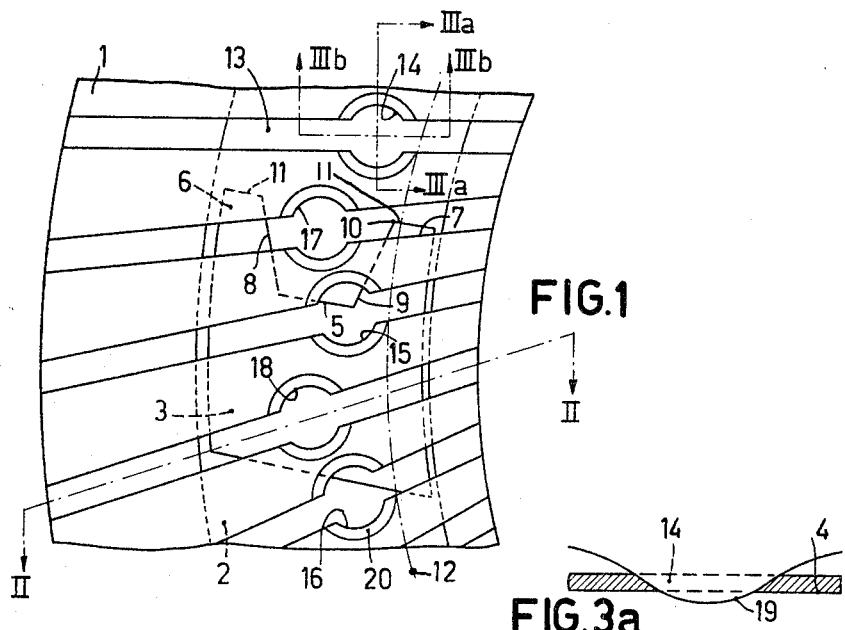
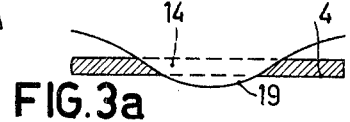
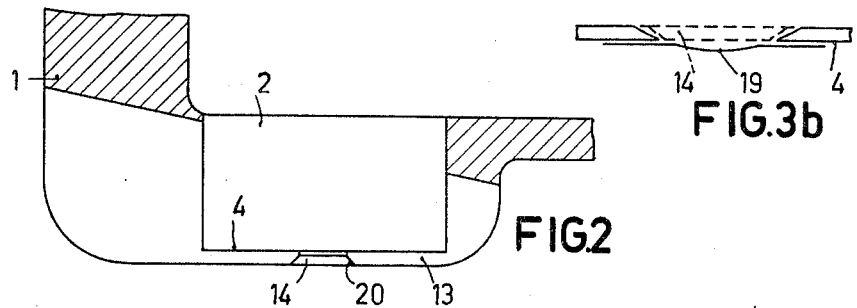
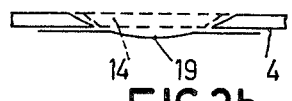
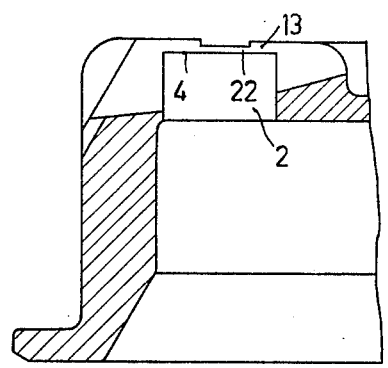
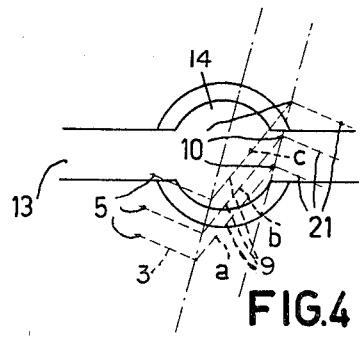
INVENTORS
GERRIT STARRE
ARIE FRANSEN
HENRICUS J. DRIESSEN 3,281,937
SHAVING HEAD SHEAR PLATE WITH VARIOUS DEPTHS OF APERTURES THEREIN
Gerrit Starre, Arie Fransen, and Henricus Josef Driessen, Drachten, Netherlands, assignors to North American Philips Company Inc., New York, N.Y., a corporation of Delaware
Continuation of application Ser. No. 266,910, Mar. 21, 1963. This application June 9, 1965, Ser. No. 462,671
Claims priority, application Netherlands, Apr. 16, 1962, 277,302
2 Claims. (Cl. 30—43.6)

A known shaving head of this type is a slotted or perforated shaving head. A problem arises, however, in this shaver with the choice of the thickness of the shaving head with a view to the width of the slots.

A thin, or locally thinned shear plate has the advantage that the user's skin can penetrate further into the slot or aperture, so that a fairly large part enters the area of operation of the cutter, the hair thus being cut more closely to their roots. However, this brings about another problem, i.e. the part of the skin penetrating through the slot may come into contact so firmly with the cutting edge that grazing and scraping of the skin may occur, particularly in the case of a sensitive skin.

The invention has for its principal object to overcome this disadvantage and is characterized in that a precursory cutting edge of the contacting surface of the cutting member joins a side which is at an angle of less than 45° to the direction of movement and which covers a path where the depth of penetration of the skin varies from a smaller to a greater value. As will be explained more fully hereinafter, this has the effect, that across the part of the shear plate joining the slotted part where the penetration depth of the skin is at a maximum the said side of the precursory surface urges back the skin and a "sagging" thin part of the shear plate, if any, to a gradually increasing extent from the side. Thus, the advantage is maintained that the hair is cut closely where the skin has penetrated most, but it is found that grazing and scraping of the skin is completely avoided.

A great advantage results therefrom in that this effect is obtained independently of the nature of a skin so that the present shaving head is a distinct improvement over known shaving heads for users having a fairly sensitive skin and who apply a fairly heavy pressure during shaving. An object of the present invention is to provide a shaving head having a shear plate with apertures, the central part of which has a smaller depth than the depths of the other outer parts, and a U-shaped cutter having cutting surfaces both at the top of the legs and on the bight portion thereof. The cutter co-acts with the shear plate and functions to urge the skin on either side of the central part of the aperture toward the central part.

With a thin perforated shear plate of uniform thickness it is known to provide the moving shear plate with rhombic apertures, the oblique sides of the rhombus joining at the corners forming the cutting edges.

It has furthermore been proposed to provide the shaving head with large apertures in order to avoid the skin scraping effect, the skin thus being capable of penerating to a greater depth but being supported by a rotating cutting member provided throughout its surface with narrowly spaced, concentric supporting ribs. This has the disadvantage that said ribs contact the skin over a large surface so that the shaving effect is hindered and the space between the ribs in front of the cutting edge of the driven cutter becomes rapidly filled with cut-off hair portions and the like, which can be removed therefrom only with difficulty. Moreover, the ribs reduce the effective width of the cutting edge with respect to the width of the shear plate.

An improvement over the above is a particularly simple embodiment of the invention in which the parts of variable penetration depth of the skin are formed by locally widened parts of the slots in the form of bores in the effective path of a movable cutting member along the shaving head. The bores in the slots are furthermore located in a staggered relationship whereby the bores are offset relative to each other in the operational path of the movable cutter.

Further advantageous particulars will be described with reference to embodiments shown diagrammatically in the drawing.

FIG. 1 is a plan view of part of the laminated shaving head according to the invention, in which the contact surface of the movable cutting member is shown.

FIG. 2 is a sectional view taken on the line II—II of FIG. 1.

FIGS. 3a and 3b show in a sectional view taken on the lines IIIa and IIIb of FIG. 1 approximately how the skin penetrates through a slot at the area of a widened part thereof, formed by a bore.

FIG. 4 shows diagrammatically in a plan view how an oblique side of the protruding part of the cutter moves past such a bore.

FIG. 5 is a sectional view like FIG. 2 of a slightly modified shaving head, parts of which are locally thinned.

Figure 6:
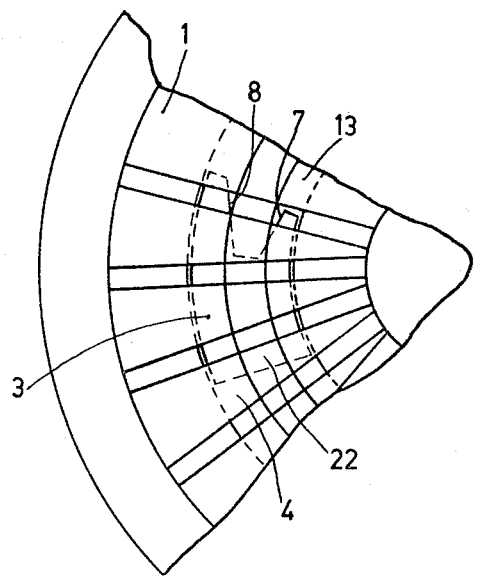
FIG. 6 is a fragmentary top plan view of the modified shaving head shown in FIG. 5.

The slotted shaving head comprises a shear plate that is designated by the numeral 1 in FIGS. 1 and 2. FIG. 2 shows that it is provided in a conventional manner on the lower side with an annular groove 2, in which the toothed rim of a rotatable cutting member 3 is located. This toothed rim is not shown in FIG. 2, but FIG. 1 shows the upper surface of one of the chisel-shaped movable cutting members 3 of the said toothed rim, which bears on the face 4 of the groove 2 of the shear plate 1.

Precursory parts 6 and 7 of the contact surface are provided with cutting edges 11 and 21. FIG. 1 discloses furthermore that each of these cutting edges joins, on the inner side, sides 8, 9, which are at an angle of about 25° to the direction of movement of the cutting member. The ends of the sides 8 and 9 are joined by a cutting edge 5. The path of the corner 10, of the cutting edge, where the side 9 touches the cutting edge 21 of the protruding face 7, is indicated by a broken line 12 (see also FIG. 4). In the embodiment shown the local varying support of the skin and hence the variable depth of penetration is obtained by local widening of the slots by means of bores, indicated by way of example by the numeral 14 in the slot 13. On the same radius such bores 15 and 16 are provided with respect to the center of rotation of the movable cutting member 3, while intermediate slots have bores 17 and 18, which are spaced apart from the center of rotation by a greater distance. Hence there are two rows of such bores throughout the circumference of the shaving head, each row having a given distance from the said center of rotation, while from one slot to the other there are alternate bores lying at different distances from the center of rotation.

FIG. 3a shows, by way of example, how the skin 19 penetrates into the widened part of the slot formed by the bore 14 in a sectional view at right angles to said slot; the depth of penetration in the sectional view of FIG. 3b being slightly greater. In a cross section (not shown) of the slot, where no bores are provided, the depth of penetration of the skin is still slightly smaller. This depth of penetration depends furthermore upon the individual properties of the skin of the user and upon the force with which the shaving head is pressed against the user's skin.

The variable depth of penetration obtained in the manner described above ensures at any rate that under all conditions in part of the effective range of the movable cutter an adequate penetration of the skin is obtained to provide optimum shaving. In the case of a soft skin, which can easily penetrate to a greater depth and/or in the case of hard pressure of the shaving head on the skin, all this also depending upon the shape of the surface to be shaved, where the shaving head operates, the risk of scraping due to a contact with the rapidly moving cutting member may occur in the parts having a greater depth of penetration, if no special precautions are taken. To this end the particular shape of this cutting member is designated to overcome this problem. The effect of the cutting edges 11 and 21 may be left out of consideration, since this is known from the traditional technique.

From FIG. 1 it will be seen that the path of the cutting edge 5 covers the larger part of the diameter of each of the relatively offset bores 14 to 18. Each of the sides 8 and 9, as will be seen particularly from FIG. 4, covers the lateral parts of one of the rows of successive bores.

FIG. 4 shows a number of successive positions a, b and c of half of the cutting member 3, the oblique side 9 forming part thereof. It will be seen that this side, during its movement, gradually urges back the skin part penetrating through the aperture 14 from a side. At the instant, when the cutting edge 5 touches the skin and when hair is cut off, the skin portion concerned will always have been urged back to an extent such that scraping will not occur while the skin penetrates therethrough to an extent such that hair is cut off very closely to the skin.

It is obvious that owing to the bevelled form of the widened parts of the slots formed by the bores e.g. 14, the edges e.g. 20 in FIGS. 1 and 2 extending thus from the contact surface of the cutting member 3 at an acute angle to the outer side, that the skin surface is smoothed and penetrates further with a given diameter of the apertures.

In the embodiment shown in FIG. 5 and FIG. 6 the slots are not widened by bores, as in the embodiments described above, but the skin penetrates further into the slots, since the shaving head is thinner in cross-section at the center of the annular groove 2. A scraping effect can be avoided by cooperation of a cutting member as described above by which a corresponding effect as set out is obtained. The sides 8 and 9 of the contact surface of the cutting member, during their movement, gradually urge back the skin on either side of the thinned part 22 of the shaving head, where these sides 8, 9 lightly contact either thickened side part 3 of the thinned portion 22.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

We claim:

1. A shaving head for use in a dry shaver comprising a U-shaped movable cutting member having cutting surfaces on the top of the legs of said cutting member and a further cutting surface on the bight portion of said cutting member, the opposed sides of said U-shaped cutting member extending obliquely to the direction of movement of said cutting surfaces of said cutting member and being at an angle of less than 45° to the direction of movement of said cutting member, and a skin-contacting shear plate having a plurality of slots therein, an annular groove in said shaving head located underneath said shear plate, said U-shaped cutting member being movable in said annular groove, the portion of said shear plate adjacent to said annular groove having a central part of smaller cross-section than the outer parts thereof, the cross-section of the central part of said portion of the shear plate being uniform throughout its entire width, and the cutting surfaces on the top of the legs of said cutting member co-acting with the outer parts of said portions of said shear plate while the further cutting surface co-acts with the central part thereof.

2. A shaving head for use in a dry shaver as claimed in claim 1 wherein the opposed sides of said cutting member are so sloped inwardly that they urge the skin on either side of said central part toward the latter.

References Cited by the Examiner
UNITED STATES PATENTS

| | | | |
|---|---|---|---|
| 2,292,931 | 8/1942 | Dicke | 30—43.6 X |
| 2,345,263 | 3/1944 | Jepson | 30—43.9 |
| 2,494,464 | 1/1950 | Vivie et al. | 30—43.6 |
| 3,191,297 | 6/1965 | Starre et al. | 30—43.6 |

WILLIAM FELDMAN, *Primary Examiner.*

MYRON C. KRUSE, *Examiner.*